United States Patent [19]
Kim

[11] Patent Number: 5,809,205
[45] Date of Patent: Sep. 15, 1998

[54] AUTOMATIC TRACKING APPARATUS AND METHOD FOR A HIFI VIDEO CASSETTE RECORDER

[75] Inventor: Gi-Chul Kim, Seoul, Rep. of Korea

[73] Assignee: Daewoo Electronics Co., Ltd., Seoul, Rep. of Korea

[21] Appl. No.: 738,868

[22] Filed: Oct. 28, 1996

[30]     Foreign Application Priority Data

Oct. 28, 1995  [KR]  Rep. of Korea .................. 1995 37861

[51] Int. Cl.⁶ .............................. H04N 5/91; H04N 5/928
[52] U.S. Cl. .................................. 386/96; 386/78
[58] Field of Search ................... 386/78, 79, 96, 386/106, 80, 39; 360/69, 71, 72.1, 72.2; H04N 5/91, 5/928

[56]              References Cited

U.S. PATENT DOCUMENTS 4,905,108  2/1990  Otakawa ................................ 360/77.14
4,912,577  3/1990  Kim ....................................... 360/77.13
4,916,555  4/1990  Hathaway et al. ..................... 360/10.3

*Primary Examiner*—Robert Chevalier
*Attorney, Agent, or Firm*—Beveridge, DeGrandi, Weilacher & Young, L.L.P.

[57]              ABSTRACT

An automatic tracking apparatus and method are disclosed in which high quality sound and picture can be recorded and reproduced for user. In the present invention, videocassette position values are calculated at the left and the right edges of envelope data by travelling the videocassette in the left and the right directions of a head. Videocassette position values are detected at the left and right edges of logic data, and videocassette position values are obtained at the rising edge and the falling edge of the logic data in accordance with a detection condition of a hifi audio signal, so that a final videocassette position value is calculated. The final videocassette position value can be also calculated at the left and the right edges of the envelope data. Therefore, high quality sound and picture can be recorded and reproduced since a final videocassette position value varies in accordance with recording states of video and audio signals.

13 Claims, 5 Drawing Sheets

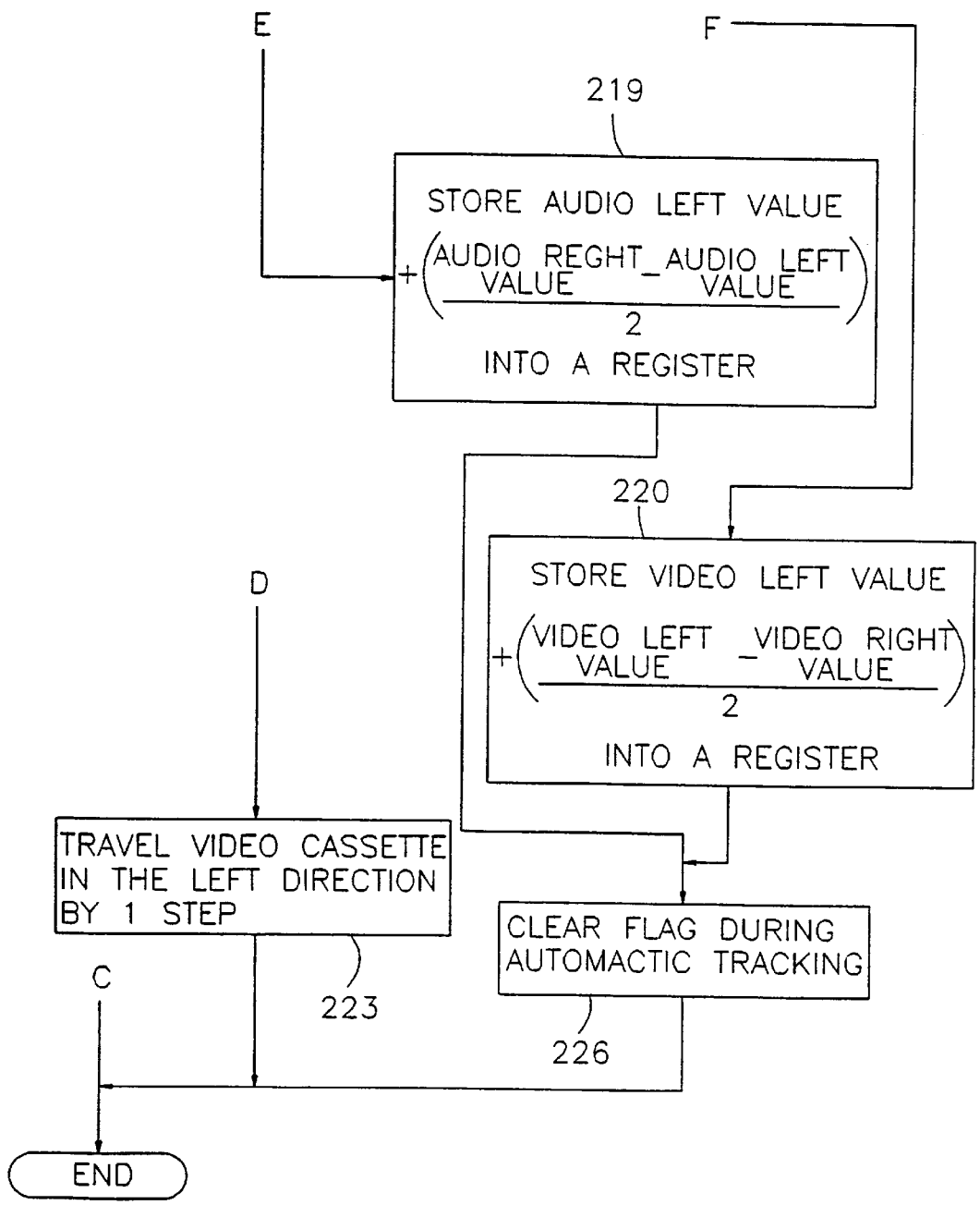

AUTOMATIC TRACKING APPARATUS AND METHOD FOR A HIFI VIDEO CASSETTE RECORDER

FIELD OF THE INVENTION

The present invention relates to a hifi video cassette recorder, and more particularly to an automatic tracking apparatus and method for a hifi video cassette recorder.

PRIOR ART

In general, video cassette recorder is classified into a normal type, a digest type, or a hifi(high fidelity) type video cassette recorders in accordance with a method for processing an audio signal which is recorded on a cassette tape. Among the video cassette recorders, the hifi type video cassette recorder, which records and reproduces an audio signal in a hifi type, is widely used because of its high quality sound. The hifi type refers to a type of recording an audio signal on a video track and reproducing the recorded audio signal by an audio head.

When recording and reproducing video and audio signals on and from a cassette tape, a hifi type video cassette recorder performs an automatic tracking. The automatic tracking performance is made by automatically controlling a head drum and a capstan motor according to a control signal and a switching signal inputted from a control head and a switching head mounted on a deck. FIG. 1 is a view for showing a conventional automatic tracking apparatus. The conventional automatic tracking apparatus includes an analog/digital(A/D) converter for converting a hifi DC envelope signal HE and a video DC envelope signal VE into digitized envelope data, respectively, for its outputs, a switching head part 2 for providing a switching pulse to operate one head among a plurality of heads, a microprocessor 3 for calculating a final cassette tape position value in order to produce high qualiy video and audio signals from the envelope data when the switching pulse of switching head part 2 and outputting a control signal for moving the cassette tape by the position value, and a drive part 4 for inputting a control signal from microprocessor 3 and operating a capstan motor.

In such conventional automatic tracking apparatus, hifi audio DC envelope signal HE and video DC envelope signal VE are supplied to a A/D converter 1, and A/D converter 1 converts hifi audio DC envelope signal HE and video DC envelope signal VE into digitized envelope data respectively for its outputs.

When the respective envelope data and the switching pulse of switching head part 2 are supplied to microprocessor 3, microprocessor 3 multiplies the respective envelope data by a weight of a slight percentage, and adds the respective weightmultiplied envelope data. Further, if a result of the addition is larger than a value stored in advance, microprocessor 3 determines the result of the addition as a final videocassette position value, and generates a control signal for travelling a videocassette to the final videocassette position. The control signal is supplied to drive part 4. Drive part 4 operates the capstan motor so as to travel the videocassette to a final videocassette position. Therefore, the automatic tracking operation is completed.

In the meantime, if the result of the addition is less than the value stored in advance, microprocessor 3 generates a control signal for travelling the videocassette in the left or right direction in order to keep performing an automatic tracking operation until when a final videocassette position value becoming larger than the stored value is calculated.

The control signal is supplied to drive part 4. Drive part 4 operates a capstan motor so as to travel a videocassette by 1 step in the left or right direction.

At this time, the relationship between the respective envelope data and the automatic tracking is shown in FIG. 2. In FIG. 2, when an addition value V1 of microprocessor 3 is in the range of 90 percent of a preset value V2, an automatic tracking operation is completed by determining as a final videocassette position value a position value (-X, +X) corresponding to the addition value V1.

However, when a videocassette on which an audio signal is recorded in a hifi manner in such conventional automatic tracking apparatus is reproduced, even though a calculated voltage value is over 90 percent of a preset voltage and a hifi audio signal is not detected, an automatic tracking operation is completed according to the calculated voltage value. Therefore, there is a drawback in that a reproduction of high quality audio and video signals is deteriorated.

SUMMARY OF THE INVENTION

Accordingly, it is an object of the present invention to provide an automatic tracking apparatus and method for a hifi videocassette recorder for reproducing high quality video signal and hifi audio signal by changing a final videocassette position value according to a recording type of video and audio signals so as to accurately perform an automatic tracking.

In order to achieve the above object, in an automatic tracking control method for a videocassette recorder according to the present invention, when either the left edge or the right edge of a logic data converted to a high level or to a low level from a hifi DC envelope signal which is reproduced from a videocassette is detected, a present videocassette position value corresponding to at least either the left edge or the right edge of the logic data is stored in an audio left register and an audio right register selected according to a travelling direction of the videocassette (step 1).

An envelope data which is converted to a digital signal from a video DC envelope signal reproduced from the videocassette is compared with 90 percent of a preset maximum voltage value, a present videocassette position value corresponding to the left edge and the right edge of the envelope data is stored in a video left register and a video right register selected according to a travelling direction of the videocassette (step 2).

Videocassette position values stored in the video left/right registers are stored in the video left/right registers of a corresponding direction by judging whether the logic data is a high level (step 3).

If a hifi audio signal is detected, a videocassette position value which are stored in the audio left register and an audio right register is calculated, and the calculated value as a first value is stored in the final videocassette register (step 4).

If the hifi audio signal is not detected, videocassette position values stored in the video right register and the video left register are calculated, and the calculated value as a second value is stored in the final videocassette register (step 5).

After the calculation of the first and second values, a control signal is generated in order for the videocassette to be travelled to a final videocassette position, and an automatic tracking flag is initialized (step 6).

From step 1 to step 3, at least one videocassette position value is obtained out of the left edge and the right edge from envelope data, and logic data inputted detects a videocassette position value at the left edge and the right edge. In step 4, a final videocassette position value is calculated from the videocassette position values at the rising edge and the falling edge of a logic data by judging a detection condition of a hifi audio signal.

In the meantime, step 5 is performed according to a result of step 4. In step 5, a final videocassette position value is calculated from the videocassette position values at the left edge and the right edge of an envelope data. Further, step 6 is performed for travelling the videocassette to the final videocassette position value calculated from steps 4 and 5. Therefore, a final videocassette position value varies according to the recording type of video and audio signals so that high quality sound and video can be effectively reproduced.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENT

Description will be made in detail hereinafter on an automatic tracking apparatus and a method for a videocassette recorder according to an embodiment of the present invention in reference with accompanying drawings.

Figure 1:
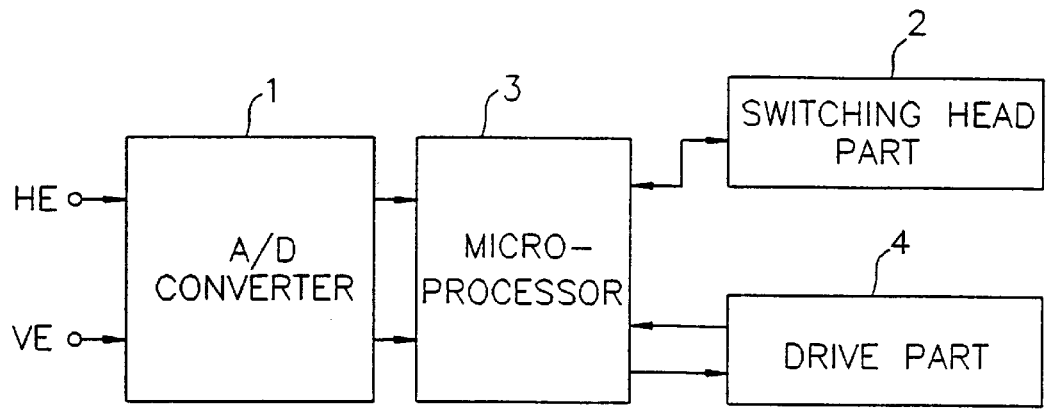
FIG. 1 is a view for schematically showing a conventional automatic tracking apparatus for a videocassette recorder.
Figure 2:
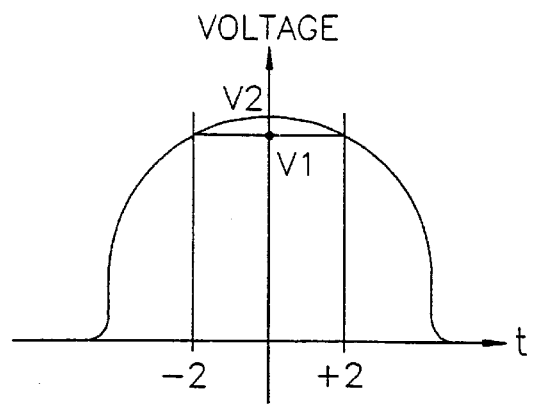
FIG. 2 is a view for showing audio/video DC envelope data obtained from the automatic tracking apparatus of FIG. 1.
Figure 3:
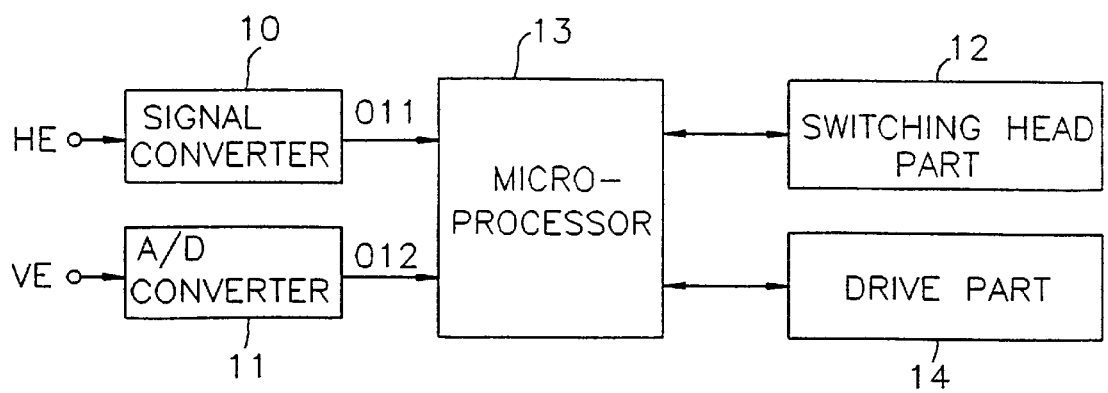
FIG. 3 is a view for showing an automatic tracking apparatus according to an embodiment of the present invention.

FIG. 3 is a view for showing an automatic tracking apparatus according to an embodiment of the present invention. As shown in FIG. 3, a signal converter 10 converts a hifi audio DC envelope signal HE inputted from a videocassette into a digital signal of envelope data, outputs a logic data O11 such as a pulse of a 5V, which is a high level, in case that the converted envelope data is over a preset voltage, and outputs a logic data O11 such as a pulse of a 0V, which is a low level, in case that the converted envelope data is below the preset voltage. An A/D converter 11 converts into a digital signal a video DC envelope signal VE reproduced from a videocassette and outputs an envelope data O12 of the digital signal. A switching head part 12 generates a switching pulse for operating one head of a plurality of heads. A microprocessor 13 calculates a final videocassette position value for reproducing high quality video and audio signals by performing an automatic tracking operation according to logic data O11 and envelope data O12 when a switching pulse is inputted, and generates a control signal for travelling a videocassette by the final videocassette position value. A drive part 14 operates a capstan motor with an input of a control signal of microprocessor 13.

Figure 4:
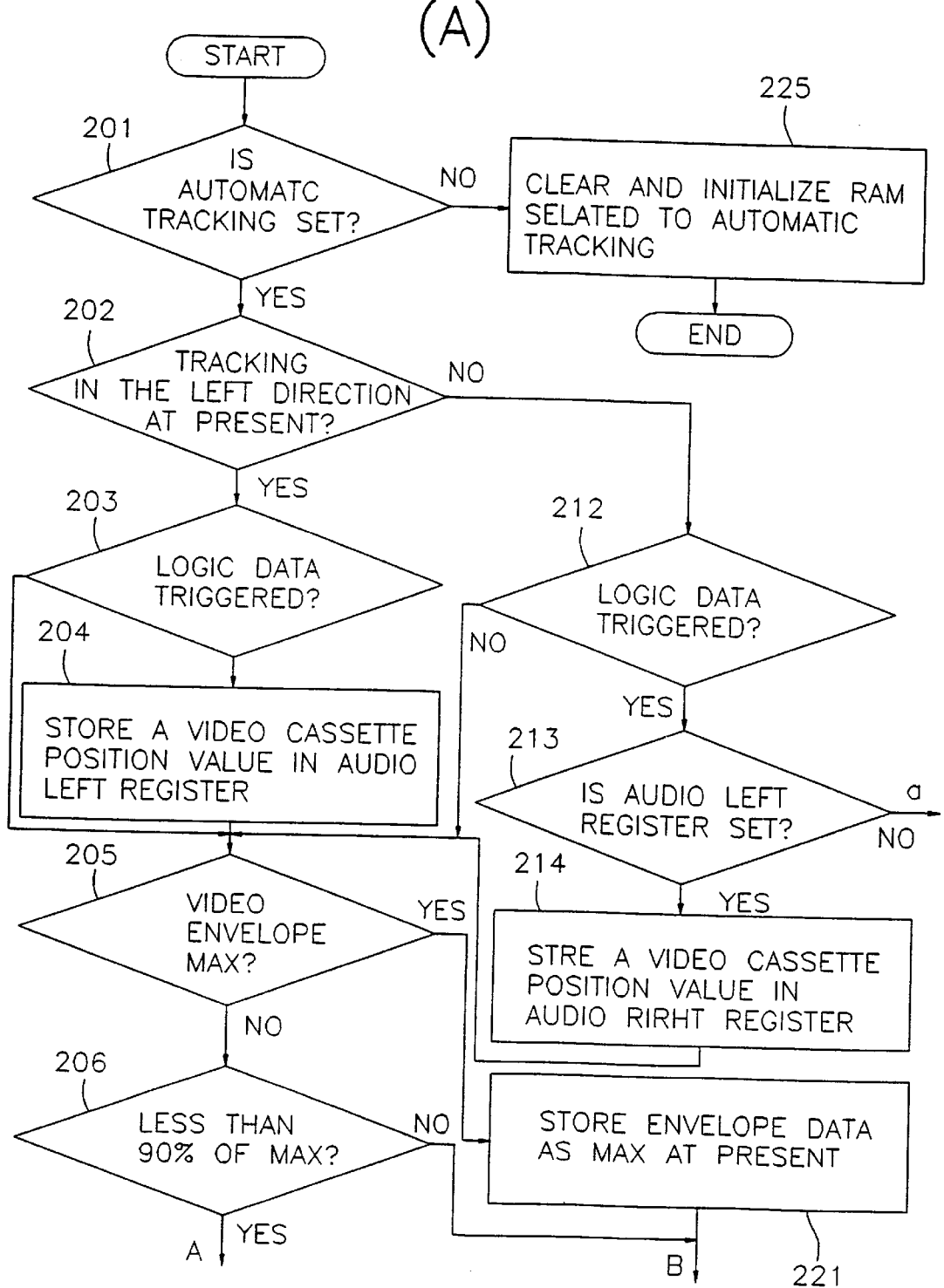
FIG. 4 (A) to (C) are views for showing an automatic tracking control method according to the embodiment of the present invention.
Figure 4:
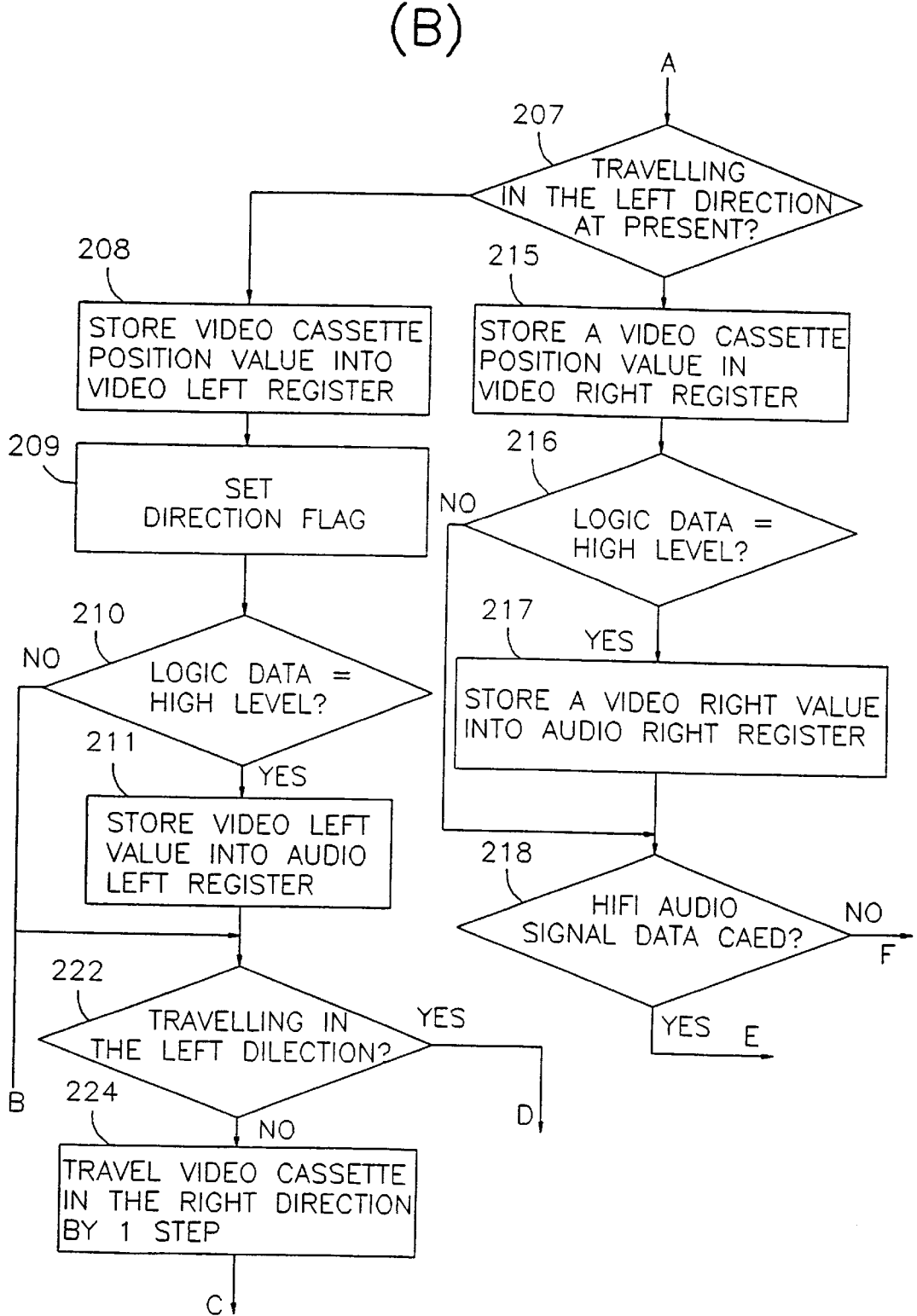

FIG. 4 (A) and (B) are views for showing an automatic tracking control method according to the embodiment of the present invention. As shown in FIG. 4 (A) and (B), if a switching pulse and logic data O11 outputted in a high level or a low level by converting a hifi DC envelope signal reproduced from a videocassette are inputted into microprocessor 3, it is detected whether an automatic tracking flag is set (step 201). If the automatic tracking flag is set, a travelling direction of a present videocassette is detected (step 202). In step 202, if it is judged that the present videocassette travels in the left direction of the head, it is detected whether logic data O11 is triggered (step 203). If it is judged that logic data O11 is triggered, a present videocassette position value is stored in an audio left register OLR (step 204).

If envelope data O12 of A/D converter 11 is supplied to microprocessor 13 after step 204 is executed, it is compared whether envelope data O12 is larger than a preset maximum voltage Max(step 205). If it is judged that envelope data O12 is less than the preset maximum voltage Max, it is compared whether a present envelope data O12 is larger than 90 percent of maximum voltage Max.

If it is judged that envelope data O12 is less than 90 percent of maximum voltage Max, it is checked whether a present videocassette travels in the left direction of the head (step 207). If the present videocassette travels in the left direction of the head, a present videocassette position value is stored in a video left register (step 208) and a flag for changing the direction after executing step 208 is set (step 209).

In the meantime, it is checked whether a present logic data is triggered to a high level after executing step 209 (step 210), and the videocassette position value of a video left register is stored in an audio left register if it is judged that logic data is triggered to a high level (step 211).

Meanwhile, in step 202, it is checked whether a logic data is triggered while a present videocassette travels in the right direction of the head (step 212). If it is determined that a logic data is triggered, it is checked whether an audio right register is set (step 213). A present videocassette position value is stored in an audio right register if it is judged that an audio right register is set, and the present videocassette position value is stored in an audio left register if the audio right register is not set (step 214). Step 205 is executed after step 214 has been excuted.

Further, a present videocassette position value is stored in a video right register while the present videocassette travels in the right direction of the head in step 207 (step 215). It is checked whether a logic data is triggered (step 216). A videocassette position value is stored in a audio right register if it is judged that the logic data is triggered (step 217).

Envelope data is stored as a maximum voltage value if the envelope data is greater than the maximum voltage value in step 205 (step 221). It is checked whether a present videocassette travels in the left direction (step 222). The videocassette is travelled by one step to the left when the videocassette travels in the left direction of the head (step 223). The videocassette is travelled by one step to the right when the videocassette does not travel in the left direction of the head (step 224).

By repeatedly executing the above steps, it is judged that a hifi audio signal is detected (step 218). If the hifi audio signal is detected, a value calculated from [a value stored in the audio left register+ (a value stored in the audio right register−a value stored in the audio left register)/2] is stored in a register as a final videocassette position value (step 219).

Further, if the hifi audio signal is not detected, a value calculated from [a value stored in the video left register+(a value stored in the video right register–a value stored in the video left register)/2] is stored in a register as a final videocassette position value (step 220).

After executing steps 219 and 220, a control signal is generated for travelling the videocassette to the final videocassette position value and an automatic tracking operation is stopped (step 225). If an automatic tracking flag is not set in step 201, the automatic tracking flag is initialized (step 226).

Operations and effects of the automatic tracking apparatus and method for a hifi videocassette recorder according to the embodiment of the present invention will be described.

An audio DC envelope signal HE detected from a videocassette is supplied to a signal converter 10, signal converter 10 converts a hifi audio DC envelope signal HE to a digital signal to output an envelope data, and a logic data 011 having a high level or a low level from the envelope data is outputted.

In the meantime, a video DC envelope signal VE detected from the videocassette is supplied to an A/D converter 11, and A/C converter 11 converts the video DC envelope signal VE into a digital signal to output an envelope data 012.

Further, logic data 011, envelope data 012 and a switching pulse of a switching head part 12 for operating one head of a plurality of heads are supplied to a microprocessor 12.

Microprocessor 12 determines whether logic data 011 is triggered, determines whether logic data 011 is the high level or the low level, determines whether envelope data 012 is less than 90 percent of a maximum voltage Max to calculate a final videocassette position value, and generates a control signal for travelling the videocassette to the final videocassette position value.

That is, microprocessor 12 changes the final videocassette position value according to a recording state of the hifi audio/video signal recorded on the videocassette.

The process for executing an automatic tracking operation mentioned above will be described in detail with reference to FIGS. 4 and 5.

If a switching pulse is supplied to a microprocessor 13, it is detected whether an automatic tracking flag is set (step 201). If the automatic tracking flag is set, a travelling direction of a present videocassette is detected (step 202). If it is judged that the present videocassette travels in the left direction of a head, it is detected whether a logic data 011 inputted in microprocessor 13 is triggered (step 203). If it is judged that logic data 011 is triggered, a present videocassette position value is stored in an audio left register (step 204).

If an envelope data 012 of an A/D converter 11 is supplied to microprocessor 13 after step 204 is executed, it is compared whether envelope data 012 is larger than a preset maximum voltage Max (step 205). If it is judged that envelope data 012 is less than the preset maximum voltage Max, it is compared whether a present envelope data 012 is larger than 90 percent of maximum voltage Max (step 206).

If it is judged that envelope data 012 is less than 90 percent of maximum voltage Max, it is checked whether a present videocassette travels in the left direction of the head (step 207). If the present videocassette travels in the left direction of the head, a present videocassette position value is stored in a video left register (step 208) and the travelling direction of the videocassette is changed to the right (step 209).

In the meantime, it is checked whether a present logic data 011 inputted in microprocessor 13 is triggered to a high level after executing step 209 (step 210), and the videocassette position value of a video left register is stored in an audio left register if it is judged that logic data 011 is triggered to a high level (step 211).

Meanwhile, in step 202, it is checked whether logic data 011 is triggered while a present videocassette travels in the right direction of the head (step 212). If it is determined that logic data 011 is triggered, it is checked whether an audio right register is set (step 213). In step 213, the present videocassette position value is stored in an audio right register if it is judged that an audio right register is set (step 214). Steps 205 and 206 are executed after step 214 has been executed. If it is determined that the present videocassette travels in the right direction, the present videocassette position value is stored in a video right register (step 215).

Further, it is determined whether logic data 011 is a high level (step 216), and a videocassette position value stored in the video right register is stored in an audio right register (step 217).

Through the steps mentioned above, it is checked whether a hifi audio signal is detected (step 218). If the hifi audio signal is detected, a value calculated from [a value stored in the audio left register+(a value stored in the audio right register–a value stored in the audio left register)/2] is stored in a register as a final videocassette position value (step 219).

Further, if the hifi audio signal is not detected, a value calculated from [a value stored in the video left register+ (a value stored in the video right register–a value stored in the video left register)/2] is stored in a register as a final videocassette position value (step 220).

In the meantime, if it is judged that the envelope data is larger than the maximum voltage value Max, the envelope data is stored in a register as a maximum voltage value (step 221). It is determined that the present videocassette travels in the left direction (step 222). If it is determined that the videocassette travels in the left direction of the head, the present videocassette travels by one step to the left of the head (step 223), and the videocassette travels by one step to the right of the head if the videocassette travels in the right of the head (step 224).

Further, the automatic tracking flag is initialized after executing steps 219 and 220 and a control signal is outputted so as to travel the videocassette to the final videocassette position value (step 225), and the automatic tracking flag is initialized if the automatic tracking flag is not set (step 226).

Figure 5:
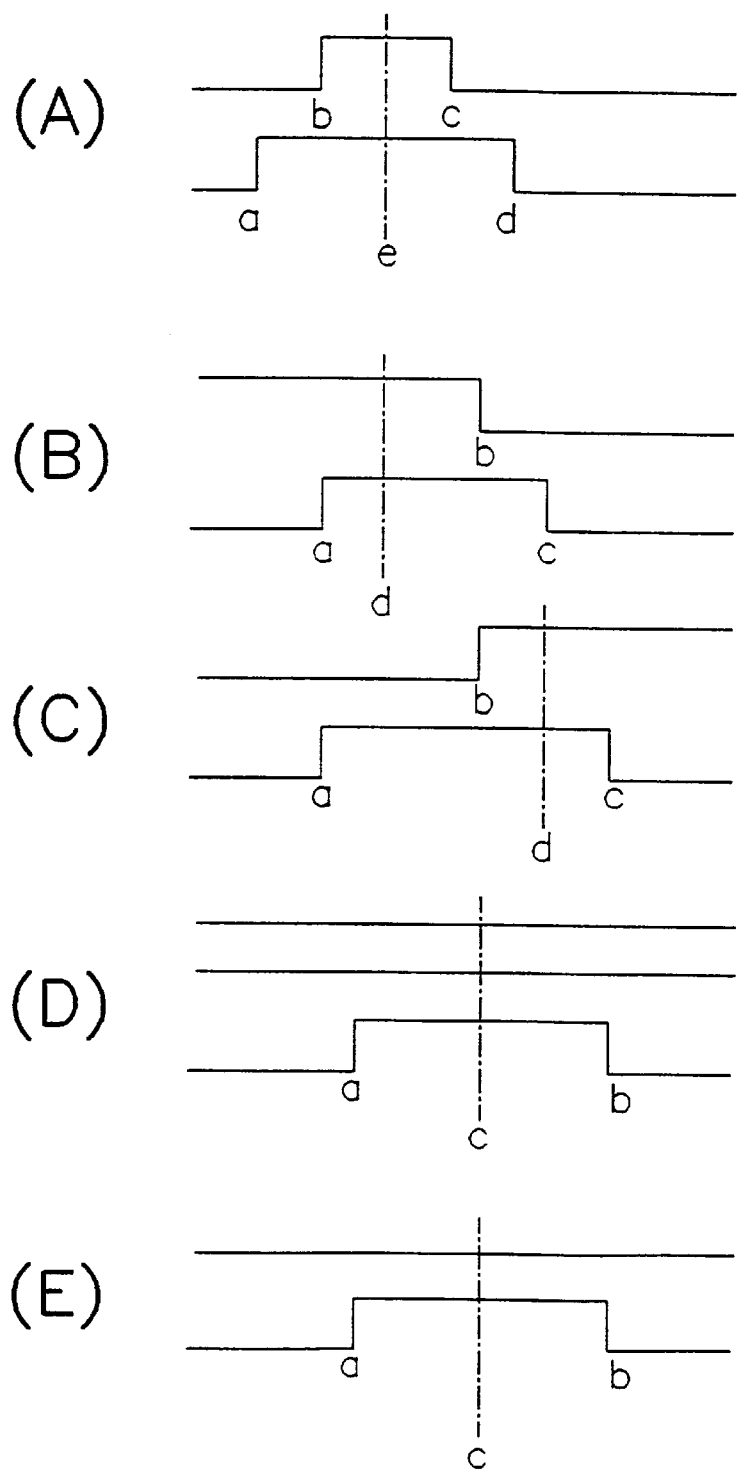
FIG. 5 (A) to (E) are views for showing logic data and envelope data from the automatic tracking apparatus of FIG. 3.

FIG. 5 (A) to (E) are views for showing logic data and envelope data from the automatic tracking apparatus of FIG. 3. Let reference numerals b and a denote values stored in audio/video left registers respectively, reference numeral c denote a value stored in an audio right register, and reference numeral d denote a value stored in a video right register.

As shown in FIG.5 (A), if the logic data and the envelope data are inputted into microprocessor 12, values b and c are stored in the audio left/right registers. Since values a and d are stored in the video left/right registers respectively so that a value calculated from step 219 is b+(c–b)/2=e, the final videocassette position value is the value of e.

As shown in FIG. 5 (B), if the logic data and the envelope data are inputted into microprocessor 12, values a and b are stored in the audio left/right registers. Since values a and c are stored in video left/right registers respectively so that a value calculated from step 219 is a+(b–a)/2=d, the final videocassette position value is the value of d.

As shown in FIG. 5 (C), if the logic data and the envelope data are inputted into microprocessor 12, values b and c are stored in the audio left/right registers. Since values a and c are stored in video left/right registers respectively so that a value calculated from step 219 is b+(c−b)/2=d, the final videocassette position value is the value of d.

In the meantime, as shown in FIG. 5 (D), if the logic data and the envelope data are inputted into microprocessor 12, values a and b are stored in the audio left/right registers. Since values a and c are stored in video left/right registers respectively so that a value calculated from step 220 is a+(b−a)/2=c, the final videocassette position value is the value of d when an automatic tracking is completed.

As shown in FIG. 5 (E), if the logic data and the envelope data are inputted into microprocessor 12, a value calculated from step 220 is a+(b−a)/2=c, the final videocassette position value is the value of d when an automatic tracking is completed.

In case of the automatic tracking apparatus and method for a hifi videocassette recorder according to the embodiment of the present invention, a mean value of a video DC envelope signal during a period of a switching pulse inputted is stored as a maximum voltage value, and a video DC envelope signal recorded on a videocassette is reproduced by travelling the videocassette to the left and right directions of a head. A videocassette position value is stored when envelope data which is a mean value of the video DC envelope signal is over 90 percent of a maximum voltage value. Further, a videocassette position value stored according to a detection condition of an inputted hifi signal is calculated to thereby obtain a final videocassette position value. Accordingly, high quality sound and picture can be recorded and reproduced since the final videocassette position value varies in accordance with video and audio recording states.

While the present invention has been particularly shown and described with reference to particular embodiment of a hifi-type videocassette recorder, the present invention can be applied to a general videocassette recorder or a camcorder. The present invention will be understood by those skilled in the art that various changes in form and details may be effected therein without departing from the spirit and scope of the invention as defined by the appended claims.

What is claimed is:

1. An automatic tracking apparatus for a hifi-type videocassette recorder, comprising:

a signal converter for converting a hifi audio DC envelope signal inputted from a videocassette into a first digital signal so as to generate first envelope data, and for outputting logic data by comparing the first envelope data with a preset voltage;

an A/D converter for converting the video DC envelope signal into a second digital signal so as to generate second envelope data;

a switching head means for generating a switching pulse to operate one if a plurality of heads;

a control means for calculating a final videocassette position value to reproduce high quality video and audio signals according to the logic data and the second envelope data while one period of the switching pulse is inputted, and for generating a control signal to travel the videocassette by the final videocassette position value; and a drive means for operating a capstan motor according to the control signal.

2. The automatic tracking apparatus as claimed in claim 1, wherein the control means calculates the final videocassette position value from the logic data, the second envelope data and the switching pulse, and performs steps to travel the videocassette to the final videocassette position value, the steps including:

a first step for detecting whether at least either a left edge or a right edge of the logic data is generated if the logic data, the envelope data and the switching pulse, and storing videocassette position values which is corresponding to at least either the left edge or the right edge into an audio left register and an audio right register;

a second step for detecting a left edge and a right edge of the second envelope data, storing videocassette position values which are corresponding to the left edge and the right edge of the second envelope data into a video left register and a video right register selected according to a travelling direction of the videocassette, respectively, and for setting a flag level to change the travelling direction of the videocassette;

a third step for determining whether the logic data is a high level, and for storing the videocassette position values of the second step into the audio left register and the audio right register, respectively;

a fourth step for determining whether a hifi audio signal is detected from the third step, calculating a final videocassette value from the videocassette position values stored in the audio left register and the audio right register;

a fifth step for calculating the final videocassette value from the videocassette position values stored in the video left register and the video right register if it is determined that the hifi audio signal is not detected from the fourth step; and a sixth step for generating the control signal to travel the videocassette to the final videocassette position value after the fourth and fifth steps, and for initializing an automatic tracking flag.

3. The automatic tracking apparatus as claimed in claim 1, wherein the first step includes a substep for storing a present videocassette position value into the audio left register in case that the videocassette travels in the left direction of a head, or for storing the present videocassette position value into the audio right register in case that the videocassette travels in the right direction of the head.

4. The automatic tracking apparatus as claimed in claim 2, wherein the second step includes a substep for storing a present videocassette position value into the video left register in case that the videocassette travels in the left direction of a head, or for storing the present videocassette position value into the video right register in case that the videocassette travels in the right direction of the head.

5. The automatic tracking apparatus as claimed in claim 2, wherein the final videocassette position value of the fourth step is obtained from (the value stored in the audio left register+ (the value stored in the audio right register−the value stored in the audio left register)/2).

6. The automatic tracking apparatus as claimed in claim 2, wherein the final videocassette position value of the fifth step is obtained from (the value stored in the video left register+ (the value stored in the video right register−the value stored in the video left register)/2).

7. The automatic tracking apparatus as claimed in claim 2, wherein a predetermined percent is about 90 percent.

8. An automatic tracking method for a hifi-type videocassette recorder, comprising:

a first step for detecting whether at least one of a left edge and a right edge of the logic data which is obtained from converting a hifi DC envelope signal reproduced from a videocassette to a high level and a low level, and storing videocassette position values which are corresponding to at least one of the left edge and the right edge into an audio left register and an audio right register;

a second step for detecting a left edge and a right edge of the envelope data in which a video DC envelope signal of the videocassette is converted into a digital signal, storing a videocassette position values which are corresponding to the left edge and the right edge of the envelope data into a video left register and a video right register selected according to a travelling direction of the videocassette, respectively, and for setting a flag level to change the travelling direction of the videocassette;

a third step for determining whether the logic data is a high level, and for storing the videocassette position values of the second step into the audio left register and the audio right register, respectively;

a fourth step for determining whether a hifi audio signal is detected from the third step, and for calculating a final videocassette value from the videocassette position values stored in the audio left register and the audio right register;

a fifth step for calculating the final videocassette value from the videocassette position values stored in the video left register and the video right register if it is determined that the hifi audio signal is not detected from the fourth step; and a sixth step for generating the control signal to travel the videocassette to the final videocassette position value after the fourth and fifth steps, and for initializing an automatic tracking flag.

9. The automatic tracking method as claimed in claim 8, wherein the first step comprises:

a first substep for storing a videocassette position value into the audio left register at the time when the logic data is triggered in case that the videocassette travels in the left direction of a head and the automatic tracking flag is set;

a second substep for storing the videocassette position value into the audio right register at the time when the logic data is triggered in case that the videocassette travels in the right direction of the head, the automatic tracking flag is set, and the audio right register is set;

a third substep for storing the videocassette position value into the audio left register at the time when the logic data is triggered in case that the videocassette travels in the right direction of the head, the automatic tracking flag is not set, and the audio right register is not set.

10. The automatic tracking method as claimed in claim 9, wherein the second step includes:

a fourth substep for storing a present videocassette position value into the video left register in case that the envelope data is less than a preset maximum voltage value as well as less than a predetermined percent of the preset maximum voltage value, and the videocassette travels in the left direction of the head;

a fifth substep for storing the present videocassette position value into the video right register in case that the videocassette travels in the right direction of the head in the fourth step; and a sixth substep for storing the envelope data into the video left register as the maximum voltage value if the envelope data is larger than the maximum voltage value in the fourth substep.

11. The automatic tracking method as claimed in claim 10, wherein the third step includes:

a seventh substep for storing the videocassette position value stored in the video left register into the audio left register if the logic data is triggered to the high level after the fourth substep has been executed;

an eighth substep for travelling the videocassette by one step in accordance with the present travelling direction of the videocassette if the logic data is triggered to the low level after the fifth substep has been executed; and a ninth substep for storing the videocassette position value stored in the video right register into the audio right register if the logic data is triggered to the high level after the fifth substep has been executed.

12. The automatic tracking method as claimed in claim 8, wherein the final videocassette position value of the fourth step is obtained from (the value stored in the audio left register+ (the value stored in the audio right register−the value stored in the audio left register)/2).

13. The automatic tracking method as claimed in claim 8, wherein the final videocassette position value of the fifth step is obtained from (the value stored in the video left register+ (the value stored in the video right register−the value stored in the video left register)/2).

* * * * *